May 4, 1937. M. D. JENKS 2,079,506
EARTH PULVERIZER
Filed July 13, 1936
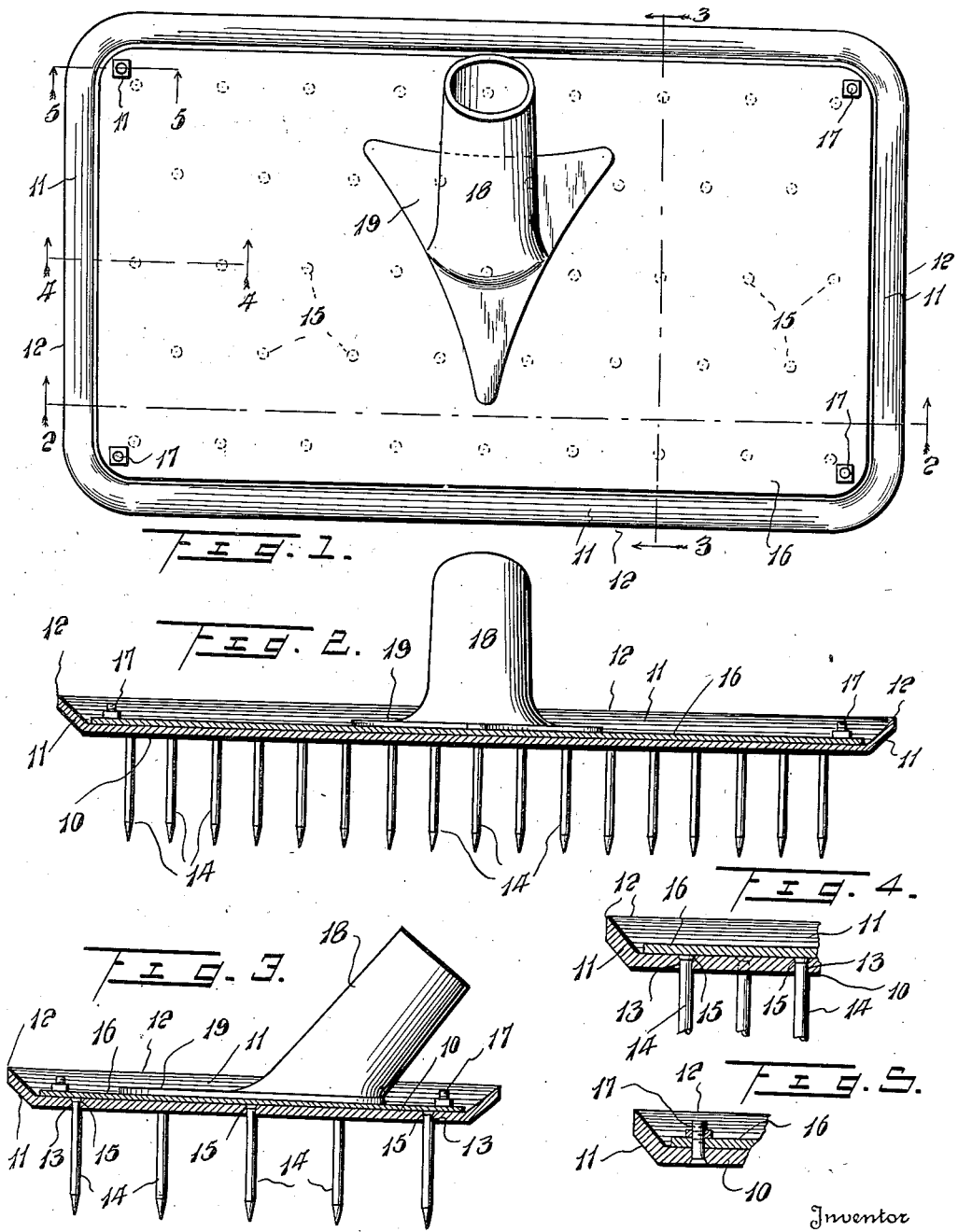
Inventor
Myron D. Jenks
By Bryant & Lowry
Attorneys Patented May 4, 1937

2,079,506

UNITED STATES PATENT OFFICE 2,079,506

EARTH PULVERIZER

Myron D. Jenks, San Fernando, Calif., assignor of one-half to Edward Weiss, Los Angeles, Calif.

Application July 13, 1936, Serial No. 90,398

6 Claims. (Cl. 47—57)

This invention relates to certain new and useful improvements in earth pulverizers.

The primary object of the invention is to provide a garden tool in the form of an earth pulverizer that produces a mulch on the surface of soil and is adapted for pulverizing the hard coat or crust that frequently forms on soil after watering, the tool also being especially serviceable in working around flower and vegetable plants as well as small shrubbery.

A further object of the invention is to provide an earth pulverizer in the form of a plate member carrying a handle and from which plate member a plurality of spikes or tines depend for earth working operations and with the marginal edge of the plate member formed at an inclination and serviceable for limited scraping and spading operations.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a top plan view of an earth pulverizer constructed in accordance with the present invention;

Figure 2 is a vertical longitudinal sectional view taken on line 2—2 of Figure 1, showing the upwardly inclined edge of the plate member that carries the depending tines;

Figure 3 is a vertical cross-sectional view taken on line 3—3 of Figure 1;

Figure 4 is a detail sectional view taken on line 4—4 of Figure 1, showing the retainer plate for the depending tines; and Figure 5 is a detail sectional view taken on line 5—5 of Figure 1, showing the bolt connection between the two plate members that support and confine the tines.

Referring more in detail to the accompanying drawing, the earth pulverizer is in the form of a portable or hand tool for garden use and comprises a plate 10, preferably rectangular in plan view as shown in Figure 1, with the marginal edge of the plate 10 inclined upwardly to provide a spader or scraper edge 11 having a knife edge 12.

The plate 10 is provided with parallel rows of spaced perforations 13 through which spikes or tines 14 extend, the upper ends of the tines 14 being swaged or counter-sunk as at 15 in the openings 13 in the plate 10 to have their upper ends flush with the upper face of the plate 10.

To retain the tines 14 in position against displacement, a rectangular retainer plate 16 is mounted upon the upper side of the plate 10 and is flatly engaged with the headed ends 15 of the tines as shown in Figures 3 and 4, the retainer plate 16 being held in position on the plate 10 by means of nut and bolt combinations 17 associated with the two plates at the corners thereof as illustrated in Figure 1.

A handle socket 18 rises at any desired angle from a base plate 19 that may be welded or otherwise secured to the retainer plate 16.

The tool is especially serviceable for the pulverization of earth around growing plants and the like, while the edge 11 may be used as a spade or a scraper in the breaking up of soil and in the removal of larger objects. Broken tines 14 may be readily replaced by removal of the retainer plate 16 and the insertion of new tines through the desired openings 13, in the plate 10.

From the above detailed description of the invention, it is believed that the construction and operation thereof will at once be apparent and while there is herein shown and described the preferred embodiment of the invention, it is nevertheless to be understood that minor changes may be made therein without departing from the spirit and scope of the invention as claimed.

I claim:—

1. In a garden tool of the character described, a plate having a flanged marginal edge and having parallel rows of spaced perforations therein, headed tines in the perforations, and a retainer plate for the tines flatly engaged with the aforesaid plate for retaining the tines in position.

2. In a garden tool of the character described, a plate having a flanged marginal edge and having parallel rows of spaced perforations therein, headed tines in the perforations, a retainer plate for the tines flatly engaged with the aforesaid plate for retaining the tines in position, and a handle socket rising from the retainer plate.

3. In a garden tool of the character described, a plate having a flanged marginal edge and having parallel rows of spaced perforations therein, headed tines in the perforations, with the heads of the tines countersunk in the perforations to lie flush with the upper surface of the plate, and a retainer plate for the tines flatly engaged with the aforesaid plate for retaining the tines in position.

4. In a garden tool of the character described, a plate having a flanged marginal edge and having parallel rows of spaced perforations therein, headed tines in the perforations, with the heads of the tines countersunk in the perforations to lie flush with the upper surface of the plate, a retainer plate for the tines flatly engaged with the aforesaid plate for retaining the tines in position, and a handle socket rising from the retainer plate.

5. In a garden tool of the character described, a plate having a flanged marginal edge and having parallel rows of spaced perforations therein, headed tines in the perforations, with the heads of the tines countersunk in the perforations to lie flush with the upper surface of the plate, a retainer plate for the tines flatly engaged with the aforesaid plate for retaining the tines in position, the retainer plate terminating at its marginal edges inwardly of the flanged marginal edge of the first named plate.

6. In a garden tool of the character described, a plate having a flanged marginal edge and having parallel rows of spaced perforations therein, headed tines in the perforations, with the heads of the tines countersunk in the perforations to lie flush with the upper surface of the plate, a retainer plate for the tines flatly engaged with the aforesaid plate for retaining the tines in position, and a handle socket rising from the retainer plate, the retainer plate terminating at its marginal edges inwardly of the flanged marginal edge of the first named plate.

MYRON D. JENKS.